United States Patent
Amit et al.

(10) Patent No.: US 9,087,137 B2
(45) Date of Patent: *Jul. 21, 2015

(54) DETECTION OF CUSTOM PARAMETERS IN A REQUEST URL

(75) Inventors: Yair Amit, Tel-Aviv (IL); Roee Hay, Herzliya (IL); Roi Saltzman, Herzliya (IL); Omer Tripp, Herzliya (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 227 days.

This patent is subject to a terminal disclaimer.

(21) Appl. No.: 13/334,718

(22) Filed: Dec. 22, 2011

(65) Prior Publication Data

US 2013/0166676 A1   Jun. 27, 2013

(51) Int. Cl.
*G06F 15/173*   (2006.01)
*G06F 17/30*   (2006.01)

(52) U.S. Cl.
CPC ................. *G06F 17/30893* (2013.01)

(58) Field of Classification Search
CPC .......... G06F 2201/875; G06F 11/3604; G06F 11/3612; G06F 17/30563; G06F 21/577; G06F 2201/86; G06F 8/75; H04L 41/0233
USPC .................................. 709/223, 224
See application file for complete search history.

(56) References Cited

U.S. PATENT DOCUMENTS

| | | | |
|---|---|---|---|
| 6,381,628 B1 * | 4/2002 | Hunt ............................. | 709/201 |
| 8,429,751 B2 * | 4/2013 | Mizrahi et al. .................. | 726/25 |
| 8,528,095 B2 * | 9/2013 | Haviv et al. ..................... | 726/25 |
| 2006/0265190 A1 * | 11/2006 | Hein ............................. | 702/186 |
| 2009/0138592 A1 * | 5/2009 | Overcash et al. .............. | 709/224 |
| 2009/0327304 A1 | 12/2009 | Agarwal et al. | |
| 2010/0235918 A1 * | 9/2010 | Mizrahi et al. .................. | 726/25 |
| 2011/0321016 A1 * | 12/2011 | Haviv et al. .................... | 717/128 |
| 2013/0111011 A1 * | 5/2013 | Moulhaud et al. ............ | 709/224 |
| 2013/0167124 A1 | 6/2013 | Amit et al. | |

OTHER PUBLICATIONS

Livshits et al., "Finding security vulnerabilities in java applications with static analysis", SSYM '05 Proceedings of the 14th conference on USENIX Security Symposium—vol. 14, 2005.*
U.S. Appl. No. 13/447,952, Non-Final Office Action, Jun. 5, 2014, 6 pg.
U.S. Appl. No. 13/447,952, Notice of Allowance, Dec. 29, 2014, 5 pg.

* cited by examiner

*Primary Examiner* — Edward Kim
(74) *Attorney, Agent, or Firm* — Cuenot, Forsythe & Kim, LLC

(57) ABSTRACT

Identifying at least one custom parameter in a request uniform resource locator (URL). At least a first portion of source code of a Web application that typically consumes the custom parameter provided in the request URL can be identified. The Web application can be instrumented at the first portion of the source code. The Web application can receive the request URL and the Web application can be executed with the instrumented source code. At least one run-time value consumed by the second portion of the source code can be identified, and the run-time value can be compared to the request URL to determine whether the run-time value intersects with the request URL. Responsive to determining that the run-time value intersects with the request URL, the run-time value can be identified as the custom parameter. A custom parameter rule can be generated based on the comparison.

12 Claims, 3 Drawing Sheets

200

215

210

String url = req.getRequestURL(); // in SrcStmts

String[] urlArr = url.split('/');

String mthdName = urlArr[INDEX_OF_MTHD_NAME];

205 String[] args = new String[urlArr.length-(INDEX_OF_MTHD_NAME+1)];

for (int i=INDEX_OF_MTHD_NAME+1; i<urlArr.length; ++i) { args[i-(INDEX_OF_MTHD_NAME+1)] = urlArr[i];

}

Method.invoke(mthdName, args);

void register(String firstName, String lastName, int yearOfBirth) {

Connection connection = getConnection();

235

Statement updateStmt = connection.createStatement();

230 updateStmt.execute(
220 "INSERT INTO Users (USER_NAME,USER_LST_NAME,BIRTH_YEAR) VALUES
('" + firstName + "','" + lastName + "','" + yearOfBirth + "')"); // in SinkStmts

File f = new File("url2params.text");
FileWriter fw = new FileWriter(f);
fw.write(url);
fw.close();

File f = new File("url2params.txt");
FileWriter fw = new FileWriter(f);
fw.write(": " + arg);
fw.printlin();
fw.close();

DETECTION OF CUSTOM PARAMETERS IN A REQUEST URL

BACKGROUND

One or more embodiments disclosed within this specification relate to security analysis.

With the advent of Internet based technologies, Web applications are increasingly becoming more sophisticated. As these technologies become more sophisticated, they also become vulnerable to exploits by unscrupulous users who access the Web-based applications (hereinafter "Web applications"). These exploits often are notoriously hard to find, in particular when a user provides a malicious payload to a server of a Web application, for instance in a user request. Accordingly, security applications have been developed to test whether a Web application is adequately secured against malicious payloads.

BRIEF SUMMARY

Arrangements disclosed within this specification relate to identifying at least one custom parameter in a request uniform resource locator (URL). An embodiment can include a computer program product for identifying at least one custom parameter in a request uniform resource locator (URL). The computer program product can include a computer-readable storage medium having computer-readable program code embodied therewith. The computer-readable program code can include computer-readable program code configured to identify at least a first portion of source code of a Web application that typically consumes the at least one custom parameter provided in the request URL, computer-readable program code configured to instrument the Web application at the first portion of the source code, computer-readable program code configured to receive by the Web application the request URL and executing the Web application with the instrumented source code, computer-readable program code configured to identify at least one run-time value consumed by the second portion of the source code, computer-readable program code configured to compare the run-time value to the request URL to the determine whether the run-time value intersects with the request URL, computer-readable program code configured to, responsive to determining that the run-time value intersects with the request URL, identify the run-time value as the custom parameter, and computer-readable program code configured to generate a custom parameter rule based on the comparison.

Another embodiment can include a computer program product for identifying at least one custom parameter in a request uniform resource locator (URL). The computer program product can include a computer-readable storage medium having computer-readable program code embodied therewith. The computer-readable program code can include computer-readable program code configured to identify at least a first portion of source code of a Web application that reads the request URL, computer-readable program code configured to identify at least a second portion of source code of the Web application that typically consumes the at least one custom parameter provided in the request URL, computer-readable program code configured to instrument the Web application at the first portion of the source code and at the second portion of the program code, computer-readable program code configured to receive by the Web application the request URL and executing the Web application with the instrumented source code, computer-readable program code configured to identify at least one run-time value consumed by the second portion of the source code, computer-readable program code configured to compare the run-time value to the request URL to the determine whether the run-time value intersects with the request URL, computer-readable program code configured to, responsive to determining that the run-time value intersects with the request URL, identify the run-time value as the custom parameter, and computer-readable program code configured to generate a custom parameter rule based on the comparison.

Another embodiment can include a system that includes a processor configured to initiate executable operations. The executable operations can include identifying at least a first portion of source code of a Web application that typically consumes the at least one custom parameter provided in the request URL, instrumenting the Web application at the first portion of the source code, receiving by the Web application the request URL and executing the Web application with the instrumented source code, identifying at least one run-time value consumed by the second portion of the source code, comparing the run-time value to the request URL to the determine whether the run-time value intersects with the request URL, responsive to determining that the run-time value intersects with the request URL, identifying the run-time value as the custom parameter, and generating a custom parameter rule based on the comparison.

BRIEF DESCRIPTION OF THE SEVERAL VIEWS OF THE DRAWINGS

FIG. 2 depicts an example of server-side source code of a Web application in accordance with one embodiment of the present invention.

FIG. 3 depicts an example of source code for a first hook that may be used to instrument source code of a Web application in accordance with one embodiment of the present invention.

FIG. 4 depicts an example of source code for a second hook that may be used to instrument source code of a Web application in accordance with one embodiment of the present invention.

DETAILED DESCRIPTION

Figure 1:
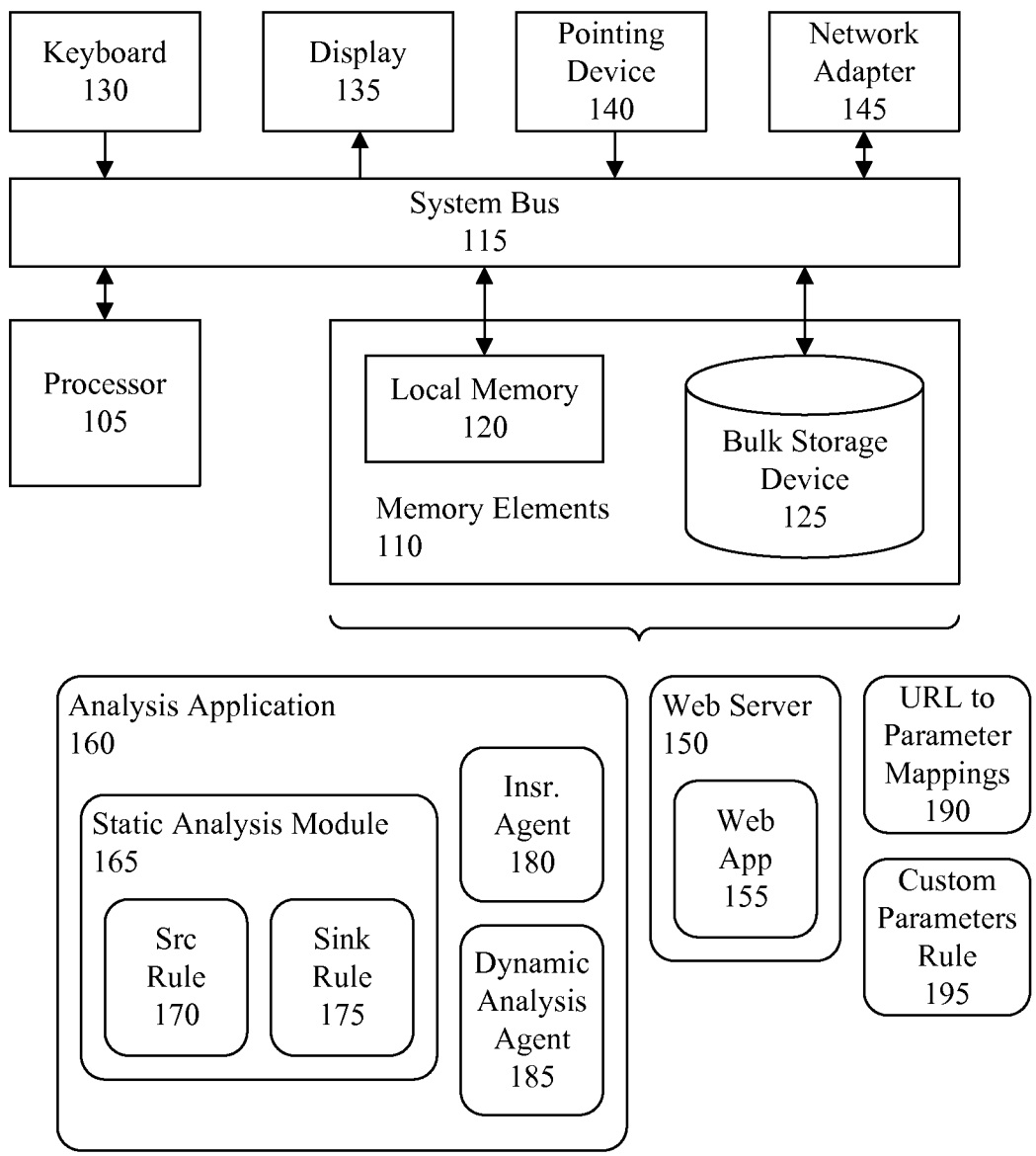
FIG. 1 is a block diagram illustrating a system for identifying at least one custom parameter in a Web application in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as JavaT™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments disclosed herein relate to identifying at least one custom parameter in a request uniform locator (URL), which may be processed by a Web application. Sometimes, unscrupulous users provide a request URL to a Web application that contains a malicious payload as a custom parameter. An analysis application, such as an application that performs security analysis, may be used to process the Web application to determine whether the Web application is adequately secured against malicious payloads provided as custom parameters. In order to do so, the analysis application can be configured to generate a custom parameter rule that may be used to identify custom parameters contained in request URLs.

Sometimes Web applications utilize well known interfaces such as conventional GET or POST parameters. Custom parameters included in request URLs received by such Web applications may be easily identified. For example, consider the following request URL:

http://www.abbcc.com/register.aspx?firstName=John&lastName=Doe&birthyear=1960

Here, the "?" character can identify request parameters "firstName=John," "lastName=Doe" and "birthyear=1960." Some Web applications, however, implement a proprietary interface, or are based on a framework that implements a proprietary interface, for receiving custom parameters in request URLs. Thus, the custom parameters may not be readily recognizable by an analysis application. An example of such a request URL is as follows:

http://www.abbcc.com/register/John/Doe/1960

In this example, the custom parameters are "John," "Doe" and "1960," but "register" is not a custom parameter. The arrangements described herein facilitate identification of custom parameters in such request URLs.

FIG. 1 is a block diagram illustrating a system 100 for identifying at least one custom parameter in a request uniform resource locator (URL) in accordance with one embodiment of the present invention. In one aspect, the system 100 can include at least one processor 105 coupled to memory elements 110 through a system bus 115. As such, the system 100 can store program code within memory elements 110. The processor 105 can execute the program code accessed from memory elements 110 via system bus 115. In one aspect, for example, the system 100 can be implemented as computer that is suitable for storing and/or executing program code. It should be appreciated, however, that the system 100 can be implemented in the form of any system comprising a processor and memory that is capable of performing the functions described within this specification.

Memory elements 110 can include one or more physical memory devices such as, for example, local memory 120 and one or more bulk storage devices 125. Local memory 120 refers to random access memory or other non-persistent memory device(s) generally used during actual execution of the program code. The bulk storage device(s) 125 can be implemented as a hard drive or other persistent data storage device. The system 100 also can include one or more cache memories (not shown) that provide temporary storage of at least some program code in order to reduce the number of times program code must be retrieved from the bulk storage device 125 during execution.

Input/output (I/O) devices such as a keyboard 130, a display 135, and a pointing device 140 optionally can be coupled to the system 100. The I/O devices can be coupled to the system 100 either directly or through intervening I/O controllers. Network adapters 145 also can be coupled to the system 100 to enable the system 100 to become coupled to other systems, computer systems, remote printers, and/or remote storage devices through intervening private or public networks. Modems, cable modems, and Ethernet cards are examples of different types of network adapters 145 that can be used with the system 100.

As pictured in FIG. 1, the memory elements 110 can store a web server 150 that hosts a Web application 155, each of which can be implemented as computer-readable program code, which may be executed by the processor 105. The memory elements 110 further can store an analysis application 160, which also can be implemented as computer-readable program code and executed by the processor 105. In another embodiment, the analysis application 160 can be stored within memory elements of another processing system (not shown) to which the processing system 100 is communicatively linked. In one aspect, the analysis application 160 can be implemented as IBM® Rational® AppScan® (IBM, Rational and AppScan are trademarks of International Business Machines Corporation in the United States, other countries, or both).

The analysis application 160 can include a static analysis module 165, an instrumentation agent 180, and a dynamic analysis agent 185. The static analysis module 165 can include a plurality of rules, for example a Src rule 170 and a sink rule 175. The Src rule 170 and a sink rule 175 can be automatically generated based on libraries used to program source code, for example standard HTML libraries. Notwithstanding, the Src rule 170 and a sink rule 175 can user configurable to allow a user to specialize and/or customize these rules. In operation, the static analysis module 165 can apply the Src rule 170 and the sink rule 175 to the Web application 155 to identify portions (e.g., statements) of the Web application's server-side source code, as will be described.

FIG. 2 depicts an example of server-side source code 200 of a Web application in accordance with one embodiment of the present invention. Of course, the Web application can include other source code and/or additional source code, and the invention is not limited in this regard. Referring both to FIG. 1 and FIG. 2, the Src rule 170 can be applied to identify portions 205 of the server-side source code 200 that read a request uniform resource locator (URL). In one non-limiting example, if the source code is JAVA® source code, the static analysis module 165 can identify "HttpServletRequest.getRequestURL" statements, for example a statement 210 within the source code 200, that initiates a URL read request. Notwithstanding, the present embodiments are not limited to JAVA, and the static analysis module 165 can identify source code that read a request using any other programming language, and the invention is not limited in this regard.

The static analysis module 165 can add one or more identifiers 215, for example statements or annotations, to the source code 200 to denote each set of statements 205 identified by the Src Rule 170. In illustration, the annotation "// in SrcStmts" can be added to the source code. In one embodiment, the identifier 215 can be added next to the first statement 210, though the invention is not limited in this regard.

Further, the static analysis module 165 can apply the sink rule 175 to the Web application 155 to identify portions 220 of the Web application's source code that typically consume data provided by a user of the Web application 155. Such statements can be, for example, statements that interact with a database or statements that render data to a display. The statements also can consume data provided by a user to perform any other operations, and the invention is not limited in this regard. As used herein, the term "consume" means to process data to perform a specific action based on the data. For example, data can be consumed to perform a search using the data as a query parameter, storing the data in a field of a data table, or the like. The invention is not limited to these examples, however, and data can be consumed by the statements to perform any other actions/processes.

Again, the static analysis module 165 can add one or more identifiers 225, for example statements or annotations, to the source code 200 of the Web application 155 to denote each set of statements identified by the sink Rule 175. In illustration, the annotation "// in SinkStmts" can be added to the source code 200 where a first statement in a set of identified statements resides, for example next to a statement 230. In this example, the actual syntax of a reflective call has been simplified away for clarity.

The static analysis module 165 can perform a forward slicing of the statements 205 identified by the Src Rule 170. The forward slicing can denote the set of statements 205 found in the source code that extract custom parameters from the request URL. Further, the static analysis module 165 can process the statements 205 and the statement 230 to determine whether an intersection between the statements 205 and the statement 230 is non-empty. If any other statements (not shown) have been identified by the sink rule 175, the static analysis module 165 also can process the statements 205 and the other statements to determine whether an intersection between the statements 205 and such other statements is non-empty. In illustration, an intersection between the statements 205 and the statement 230 can be non-empty if the statement 230 consumes data obtained by the statements 205. If the statement 230 does not use data obtained by the statements 205, then the intersection between the statements 205 and the statement 230 can be considered empty.

If the intersection between the statements 205 and the statement 230, or any other statements, is non-empty, then the static analysis module 165 can trigger the instrumentation agent 180 to instrument the statements 205. The instrumentation can provide hooks that obtain the run-time values assigned to variables processed by the statements 205 when the Web application 155 is executed. The instrumentation also can provide hooks that obtain the run-time values consumed by the statement 230.

FIG. 3 depicts an example of source code 300 for a first hook that may be used to instrument source code of a Web application in accordance with one embodiment of the present invention. When instrumenting the source code 200, the instrumentation agent 180 can add the source code to the source code below the statement 210, for example between the statement "String url=req.getRequestURL( );" and the statement "String[ ] urlArr=url.split('/');". When the instrumented Web application 155 is executed, for example in response to the web server 150 receiving a URL containing custom parameters, the source code 300 can persist bytecode and/or binary instrumentation (either static or dynamic) related to the custom parameters into a file.

FIG. 4 depicts an example of source code 400 for a second hook that may be used to instrument source code of a Web application in accordance with one embodiment of the present invention. When instrumenting the source code 200, the instrumentation agent 180 can add the source code to the source code above a statement 235, for example between the statement "Connection connection=getConnection( );" and the statement "Statement updateStmt=connection.createStatement( );". When the instrumented Web application 155 is executed, the source code 400 can persist a run-time value corresponding to a variable operated upon by the statement 230 to the file in which the custom parameters are persisted. In illustration, the source code 400 can write the value corresponding to the variable "arg" to the file. In this example, the value can include parameters for the variables "firstName," "lastName" and "yearOfBirth" identified in the statement 230.

Referring again to FIG. 1, execution of the instrumented version of the Web application 155 can be triggered multiple times by the dynamic analysis agent 185. For example, the dynamic analysis agent 185 can generate a first request URL that includes sample custom parameters, and communicate such request URL to the web server 150. An example of the first request URL is "http://localhost:8080/register/John/Doe/1960." When the source code 200 is executed with this request URL, the following mapping can occur:
INSERT INTO Users (USER_NAME,USER_LST_NAME,BIRTH_YEAR) VALUES ('John', 'Doe', '1960')

The dynamic analysis agent 185 also can generate a second request URL that includes sample custom parameters, and communicate such request URL to the web server 150. An example of second request URL is "http://localhost:8080/register/Mary/Allan/1975." When the source code 200 is executed with this request URL, the following mapping can occur:
INSERT INTO Users (USER_NAME,USER_LST_NAME,BIRTH_YEAR) VALUES ('Mary', 'Allan', '1975')
Still, other request URLs and/or additional request URLs can be generated to perform numerous traces of the Web application's execution.

Referring again to FIG. 2, during each trace, via the hooks, the dynamic analysis agent 185 can track all flows of run-time values, which can be identified as custom parameters, extending from the statements 205 identified by the identifier 215 to the statement 230 identified by the identifier 225. Further, the run-time values consumed by the statement 230 can be sampled. For each sampled value, a determination can be made whether the value intersects with the request URL that triggered the trace, for example by comparing the value to the request URL. Such request URL can be pointed to by the variable defined in the statement 210. For each sample value that intersects with the request URL, the dynamic analysis agent 185 can add a mapping from the request URL to that value. Such mapping can be persisted to a file, such as a URL to parameter mappings file 190. The parameter mappings file 190 can be stored to the memory elements 110, or to another suitable data storage device.

Based on the mappings contained in the parameter mappings file 190, a custom parameter rule 195 can be interpolated. The custom parameter rule 195 can be interpolated using standard statistical/machine-learning methods. For example, the interpolation engine can record features such as "The 2nd (or more generally, n-th) '/'-delimited segment in the request is consumed as data." If this observation repeats itself over sufficiently many inputs, then this portion of the request can be treated as a custom parameter.

The custom parameter rule 195 can specify which parts of request URLs are treated as parameters by the Web application 155. Further, the custom parameter rule 195 can identify a set of delimiters that govern the extraction of custom parameters from request URLs. When a subsequent request URL is received by the web server 150 and/or the Web application 155, the custom parameter rule 195 can be applied to identify at least one custom parameter contained in the subsequent request URL.

Figure 5:
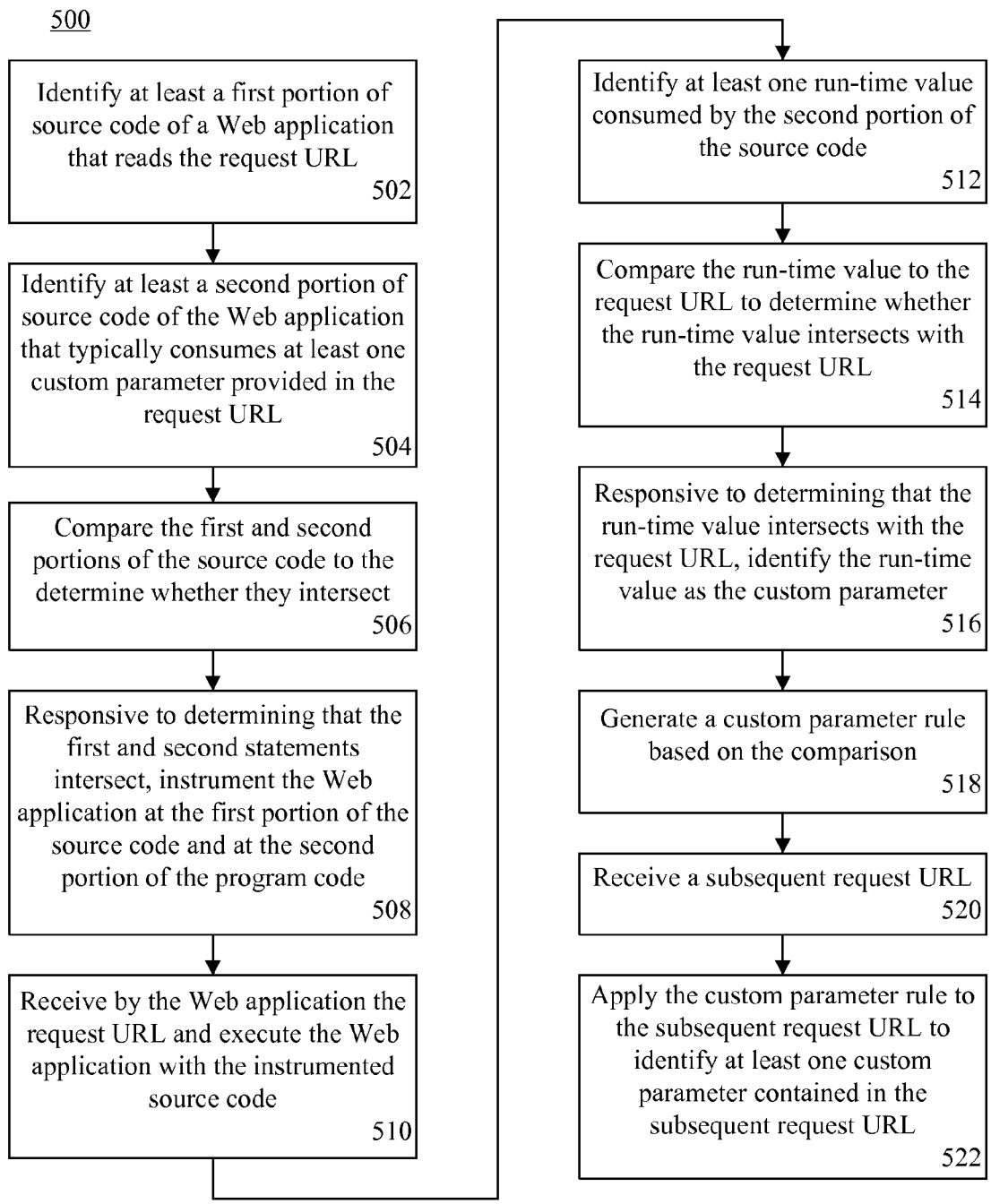
FIG. 5 is a flow chart illustrating a method of identifying at least one custom parameter in a Web application in accordance with another embodiment of the present invention.

FIG. 5 is a flow chart illustrating a method 500 of identifying at least one custom parameter in a Web application in accordance with another embodiment of the present invention. At step 502, at least a portion of source code of a Web application that reads a request URL can be identified. For example, one or more statements in the source code can be identified. At step 504, at least a second portion of source code (e.g., one or more statements) of the Web application that typically consumes at least one custom parameter provided in the request URL can be identified.

At step 506, the first and second portions of the source code can be compared to determine whether they intersect. At step 508, responsive to determining that the first and second statements intersect (e.g., an intersection between the first and second statements is non-empty), the Web application can be instrumented at the first portion of the source code and at the second portion of the program code. At step 510, a request URL can be received by the Web application and the Web application can be executed with the instrumented source code. At step 512, at least one run-time value consumed by the second portion of the source code can be identified.

At step 514, the run-time value can be compared to the request URL to determine whether the run-time value intersects with the request URL. At step 516, responsive to determining that the run-time value intersects with the request URL, the run-time value can be identified as a custom parameter. Steps 510-516 can be repeated multiple times with different request URLs. At step 518, a custom parameter rule based on the comparison(s) made at step 516 can be generated.

At step 520, a subsequent request URL can be received. At step 522, the custom parameter rule can be applied to the subsequent request URL to identify at least one custom parameter contained in the subsequent request URL.

As used herein, ordinal terms (e.g. first, second, third, fourth, fifth, sixth, seventh, eighth, ninth, tenth, and so on) distinguish one item (e.g., portion, statement, request URL, or the like) from another item. Thus, an ordinal term used herein need not indicate a specific position in an ordinal series. For example, a portion of source code identified as a "second portion" may occur before a portion of source code identified as a "first portion." Moreover, one or more portions of source code may occur between a first portion and a second portion.

Like numbers have been used to refer to the same items throughout this specification. The flowchart and block diagram in the Figures illustrate the architecture, functionality, and operation of possible implementations of systems, methods and computer program products according to various embodiments of the present invention. In this regard, each block in the flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer program product comprising:
a computer-readable storage device having computer-readable program code embodied therewith, the computer-readable program code comprising:
computer-readable program code configured to identify at least a first portion of source code of a Web application that typically consumes at least one custom parameter provided in a request URL;
computer-readable program code configured to instrument the Web application at the first portion of the source code by adding to the first portion of the source code additional code configured to obtain run-time values assigned to variables processed by statements of the first portion of the source code;
computer-readable program code configured to receive by the Web application the request URL and executing the Web application with the instrumented source code;
computer-readable program code configured to identify at least one run-time value consumed by a second portion of the source code;
computer-readable program code configured to compare the run-time value to the request URL to determine whether the run-time value intersects with the request URL, wherein the run-time value intersects with the request URL if the run-time value is obtained responsive to the first portion of source code consuming the request URL;
computer-readable program code configured to, responsive to determining that the run-time value intersects with the request URL, identify the run-time value as the custom parameter; and
computer-readable program code configured to generate a custom parameter rule based on the comparison.

2. The computer program product of claim 1, the computer-readable program code further comprising:

computer-readable program code configured to identify at least the second portion of source code of the Web application that reads the request URL; and
computer-readable program code configured to instrument the Web application at the second portion of the source code.

3. The computer program product of claim 2, wherein:
the computer-readable program code configured that identifies the first portion of source code comprises computer-readable program code configured to identify at least a first statement that typically consumes the at least one custom parameter provided in the request URL; and
the computer-readable program code configured that identifies the second portion of source code comprises computer-readable program code configured to identify at least a second statement that reads the request URL;
the computer-readable program code further comprising:
computer-readable program code configured to add a first identifier to the source code to denote the first statement; and
computer-readable program code configured to add a second identifier to the source code to denote the second statement.

4. The computer program product of claim 3, the computer-readable program code further comprising:
computer-readable program code configured to determine whether the first statement and the second statement intersect;
wherein instrumenting the Web application at the first portion of the source code comprises, responsive to determining that the first statement and the second statement intersect, instrumenting the source code at the first portion of the source code to obtain the run-time value, wherein the run-time value is assigned to at least one variable processed by the first statement when the Web application is executed.

5. The computer program product of claim 4, the computer-readable program code further comprising:
computer-readable program code configured to, during execution of the source code, track at least one flow of the run-time value from the second statement to the first statement; and
computer-readable program code configured to create a mapping from the run-time value to the request URL.

6. The computer program product of claim 5, wherein the computer-readable program code configured to generate the custom parameter rule comprises:
computer-readable program code configured to interpolate the custom-parameter rule based on the mapping of the run-time value to the request URL.

7. The computer program product of claim 1, the computer-readable program code further comprising:
computer-readable program code configured to receive by the Web application a subsequent request URL; and
computer-readable program code configured to apply the custom parameter rule to the subsequent request URL to identify at least one custom parameter contained in the subsequent request URL.

8. A computer program product comprising:
a computer-readable storage device having computer-readable program code embodied therewith, the computer-readable program code comprising:
computer-readable program code configured to identify at least a first portion of source code of a Web application that reads a request URL;
computer-readable program code configured to identify at least a second portion of source code of the Web application that typically consumes at least one custom parameter provided in the request URL;

computer-readable program code configured to instrument the Web application at the first portion of the source code and at the second portion of the source code by adding to the first portion of the source code and the second portion of the source code additional code configured to obtain run-time values assigned to variables processed by statements of the respective portions of the source code;

computer-readable program code configured to receive by the Web application the request URL and executing the Web application with the instrumented source code;

computer-readable program code configured to identify at least one run-time value consumed by the second portion of the source code;

computer-readable program code configured to compare the run-time value to the request URL to determine whether the run-time value intersects with the request URL, wherein the run-time value intersects with the request URL if the run-time value is obtained responsive to the first portion of source code consuming the request URL; and computer-readable program code configured to generate a custom parameter rule based on the comparison.

9. The computer program product of claim 8, wherein:

the computer-readable program code configured to identify the first portion of source code comprises computer-readable program code configured to identify at least a first statement that reads the request URL;

the computer-readable program code configured to identify the second portion of source code comprises computer-readable program code configured to identify at least a second statement that typically consumes the at least one custom parameter provided in the request URL; and the computer-readable program code further comprising:

computer-readable program code configured to add a first identifier to the source code to denote the first statement; and computer-readable program code configured to add a second identifier to the source code to denote the second statement.

10. The computer program product of claim 9, the computer-readable program code further comprising:

computer-readable program code configured to determine whether the first statement and the second statement intersect;

wherein the computer-readable program code configured to instrument the Web application at the second portion of the source code comprises computer-readable program code configured to, responsive to determining that the first statement and the second statement intersect, instrument the source code to obtain the run-time value, wherein the run-time value is assigned to at least one variable processed by the second statement when the Web application is executed.

11. A system comprising:

a hardware processor configured to initiate executable operations comprising:

identifying at least a first portion of source code of a Web application that typically consumes the at least one custom parameter provided in the request URL;

instrumenting the Web application at the first portion of the source code by adding to the first portion of the source code additional code configured to obtain run-time values assigned to variables processed by statements of the first portion of the source code;

receiving by the Web application the request URL and executing the Web application with the instrumented source code;

identifying at least one run-time value consumed by a second portion of the source code;

comparing the run-time value to the request URL to determine whether the run-time value intersects with the request URL, wherein the run-time value intersects with the request URL if the run-time value is obtained responsive to the first portion of source code consuming the request URL;

responsive to determining that the run-time value intersects with the request URL, identifying the run-time value as the custom parameter; and generating a custom parameter rule based on the comparison.

12. The system of claim 11, wherein the processor is configured to initiate executable operations comprising:

identifying at least the second portion of source code of the Web application that reads the request URL; and instrumenting the Web application at the second portion of the source code.

* * * * *